United States Patent [19]
Vernon et al.

[11] Patent Number: 5,399,224
[45] Date of Patent: Mar. 21, 1995

[54] METHOD AND APPARATUS FOR PRODUCING TAGGED ARTICLES

[75] Inventors: Geoffrey W. Vernon, Kenilworth; Andrew Cleall, Radford, both of Great Britain

[73] Assignee: Thomas J. Lipton Co., Englewood Cliffs, N.J.

[21] Appl. No.: 122,033

[22] Filed: Sep. 14, 1993

[30] Foreign Application Priority Data

Sep. 17, 1992 [GB] United Kingdom ............... 9219657

[51] Int. Cl.⁶ .............................................. B32B 31/04
[52] U.S. Cl. ........................................ 156/324; 156/265; 156/552; 156/554; 53/134.2; 426/77; 426/79; 426/80; 426/83; 426/394
[58] Field of Search ............... 156/166, 252, 552, 554, 156/324, 265; 53/134.2, 413, 449; 206/0.5, 806; 426/77, 79, 80, 83, 394

[56] References Cited

U.S. PATENT DOCUMENTS

| 2,149,713 | 3/1939 | Webber . |
| 2,335,159 | 11/1943 | Salfisberg . |
| 2,556,383 | 6/1951 | Williams . |
| 2,925,171 | 2/1990 | Eaton . |
| 4,394,204 | 7/1983 | Hutcheson . |
| 4,415,597 | 11/1983 | Romagnoli . |
| 4,506,490 | 3/1984 | Klar . |
| 4,961,301 | 11/1990 | Bonomelli . |
| 5,135,762 | 8/1992 | Vernon et al. . |

FOREIGN PATENT DOCUMENTS

| 0448325 | 9/1991 | European Pat. Off. . |
| 0489554 | 6/1992 | European Pat. Off. . |
| 1022960 | 1/1958 | Germany . |
| 570798 | 12/1975 | Switzerland . |
| 0962038 | 6/1964 | United Kingdom . |
| 1541054 | 2/1979 | United Kingdom . |
| 1550381 | 8/1979 | United Kingdom . |
| 2049547 | 12/1980 | United Kingdom . |
| 2052428 | 1/1981 | United Kingdom . |
| 2151214 | 7/1985 | United Kingdom . |
| 2201934 | 9/1988 | United Kingdom . |
| 2202819 | 11/1988 | United Kingdom . |
| 2231023 | 11/1990 | United Kingdom . |
| WO92/14649 | 9/1992 | WIPO . |

*Primary Examiner*—Caleb Weston
*Attorney, Agent, or Firm*—James J. Farrell

[57] ABSTRACT

Tags and thread are assembled together for the manufacture of tagged articles such as infusion packets in which each tag is attached to the packet by a length of thread. The thread is held in a looped form between the tag and the packet before use. For the assembly of the tags and thread and to increase the length of thread attaching each tag, means are provided for forming a doubled-over loop that can be trapped between the tag and the packet.

14 Claims, 8 Drawing Sheets

METHOD AND APPARATUS FOR PRODUCING TAGGED ARTICLES

BACKGROUND OF THE INVENTION

This invention relates to tagged articles and a method and apparatus for producing such articles.

EP 489554A describes an apparatus and method for use in producing tagged articles in which a length of thread is brought together with a series of spaced tags and is attached adhesively to the tag after drawing out the thread between succeeding tags. By drawing out the thread between successive tags, as is described in EP 448325A, an assembly of thread and tags is provided which can be utilized in the manufacture of infusion packets each of which is to have a tag attached to it through a length of thread by means of which the packet is suspended in use.

If it is left loose, the additional length of the thread between tags can create problems in subsequent stages of manufacturing and packing the packets by mechanical means. EP 489554A proposes to assemble the thread and tags to a web of packet material in such a way that a part of the loose length of thread is held between the tag and the web so preventing it moving about uncontrollably during the subsequent stages of processing. The length that can be held secure by the means described in EP 489554A is limited, however, and other known arrangements for producing articles in which longer lengths are held secure cannot be operated at comparable rates of production.

SUMMARY OF THE INVENTION

It is an object of the present invention to provide an improved method and apparatus for retaining surplus lengths of thread between a packet material web and a series of spaced tags.

According to one aspect of the invention, there is provided an apparatus for assembling the tags at spaced intervals along the length of the web with a length of attaching thread between each pair of tags having a length greater than the spacing between the tags, the apparatus comprising means for forming the thread between the tags into loops, means for doubling over the loops so formed, and means for locating the doubled loops at least partially between the tags and the web to hold them releasably in said doubled form.

Preferably, the loops are formed by means which produce a series of loops between successive tags extending transversely from the tags and displacement means are arranged to be inserted in the loops to overlap a portion of each loop with its associated tag for said doubling over of the loops. Gathering means may be provided to engage with the thread held by the displacement means and be movable relative to said displacement means to at least approximately equalize the lengths of the thread loop on each side of the displacement means.

According to another aspect of the invention, a method is provided for assembling a series of tags at spaced intervals along the length of a web with an attaching thread for securing each tag to the web, the thread being formed into loops between the tags whereby the thread between the tags has a length greater than the tag spacing, said loops being doubled over and being located at least partially between the tags and the web to hold them releasably in said doubled form.

In a further aspect of the invention, a tagged article is provided comprising a main body of a sheet material or web, and a tag detachably secured to said body, a thread secured at opposite ends to the tag and the body, an intermediate length of the thread between said ends being held releasably between the tag and the body in the form of a folded loop.

The invention will be further described by way of example with reference to the accompanying drawings.

DESCRIPTION OF THE PREFERRED EMBODIMENT

Figure 1:
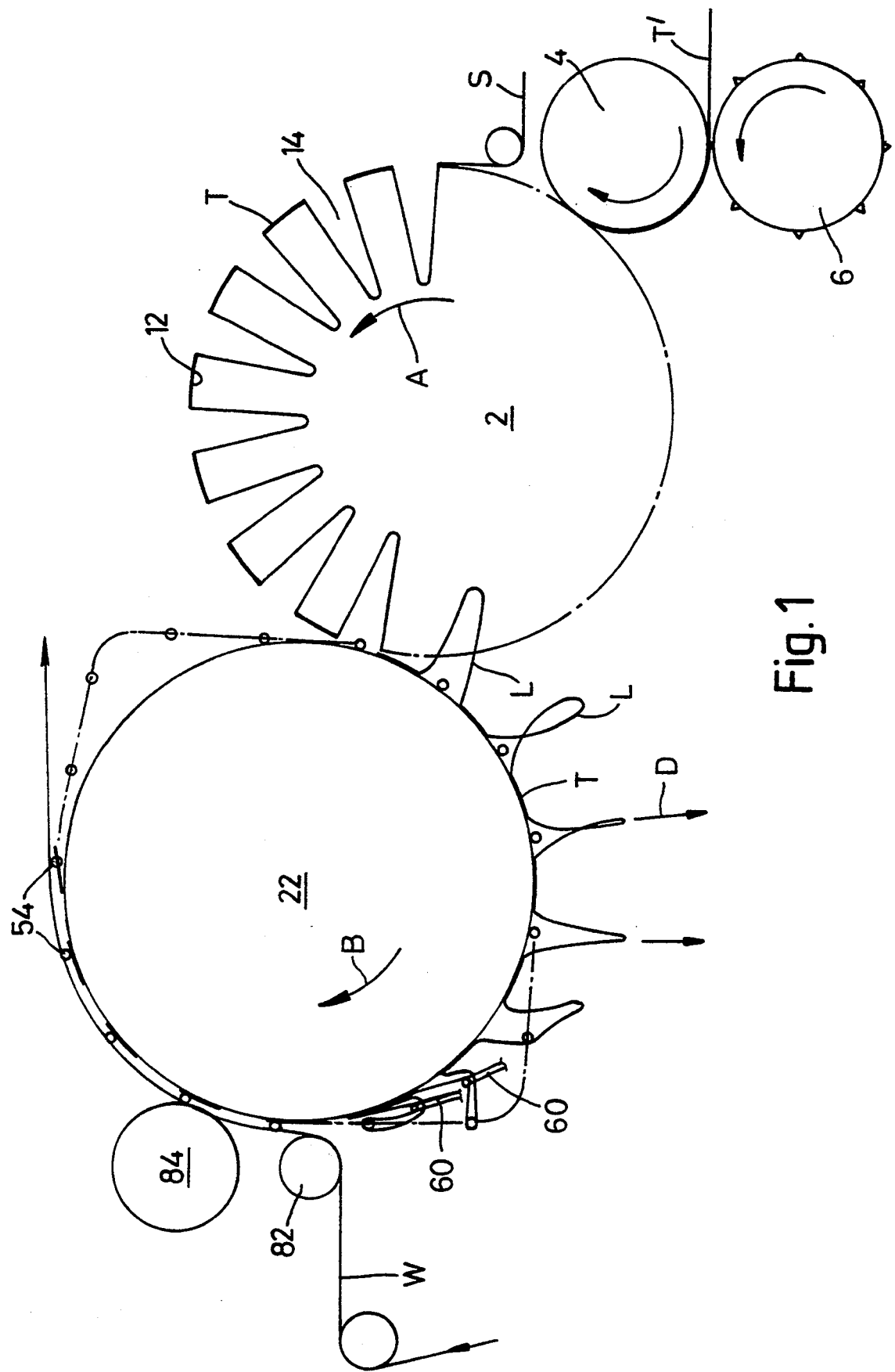
FIG. 1 illustrates in outline an apparatus according to the invention for assembling together tags and thread with a web of sheet material from which infusion packets are subsequently formed.

The illustrated apparatus comprises a first assembly wheel 2 rotating in the direction A and on which the tags T and thread S are brought together. The tag material is supplied as a continuous strip T' to a transfer wheel 4 provided with suction seats (not shown) on its periphery. A cutter rotor 6 acts against the transfer wheel 4 with the strip between them to sever the strip into the individual tags which are held against the transfer wheel by the suction of the suction seats.

As the transfer wheel rotates it brings the tags T to the first assembly wheel 2 which similarly has a series of spaced peripheral seats 12 provided with suction means. At the point of closest approach between the wheels, the tags are in contact with suction seats on both wheels 2,4 and are transferred to the assembly wheel 2 by switching the vacuum applied to the transfer wheel suction seat on one side of the tag the assembly wheel seat on the other side of the tag. The first assembly wheel 2 rotates at a faster peripheral speed than the transfer wheel 4, so that as the transfer wheel brings the tags to the assembly wheel they are registered with the spaced seats 12.

A continuous length of thread S is supplied to the first assembly wheel 2 to overlie the tags T downstream of the transfer wheel. As the thread is laid onto the tags, arms (not shown) rotating with the assembly wheel 2 draw lengths of the thread into slots 14 in the wheel separating successive tag seats 12. In all the aforementioned and other respects the assembly wheel 2 can be constructed in the same manner as the first assembly wheel described and illustrated in EP 489554A mentioned above, to which reference may be made for further details.

A second assembly wheel 22 located close to the first assembly wheel 2 is similarly provided with seats (not shown) on its periphery having suction means for holding the tags. The second wheel rotates in the direction B, counter to the first wheel. The tags are transferred from the first wheel 2 to the second wheel 22 by switching the vacuum to the suction seats on the second wheel in the same way as they are transferred to the first wheel 2. The thread is now trapped between the suction seats and the tags on the second assembly wheel 22. The thread lengths drawn into the recesses 14 of the first wheel hang down as loose loops L between successive tags as they move downwards away from the first wheel.

A continuous toothed belt 30 is associated with the second assembly wheel 22. It circulates around a large drive wheel 32 rotating on a fixed central boss 34 of the second assembly wheel 22 and two smaller idler wheels 36a,36b journalled in a fixed support plate 38. The wheels 32,36a,36b define a track 40 within the periphery of the plate 38 which the belt 30 follows. More specifically, the belt 30 follows the circular path of the drive wheel 32 along part of its course but deviates along an angular course in two diametrically opposite regions, over the idler wheels 36a,36b. The drive wheel 32 is coupled to the second assembly wheel 22 by a drive flange 42 so that the belt 30 moves at the same speed as the peripheral speed of the assembly wheel 22.

Figure 2:
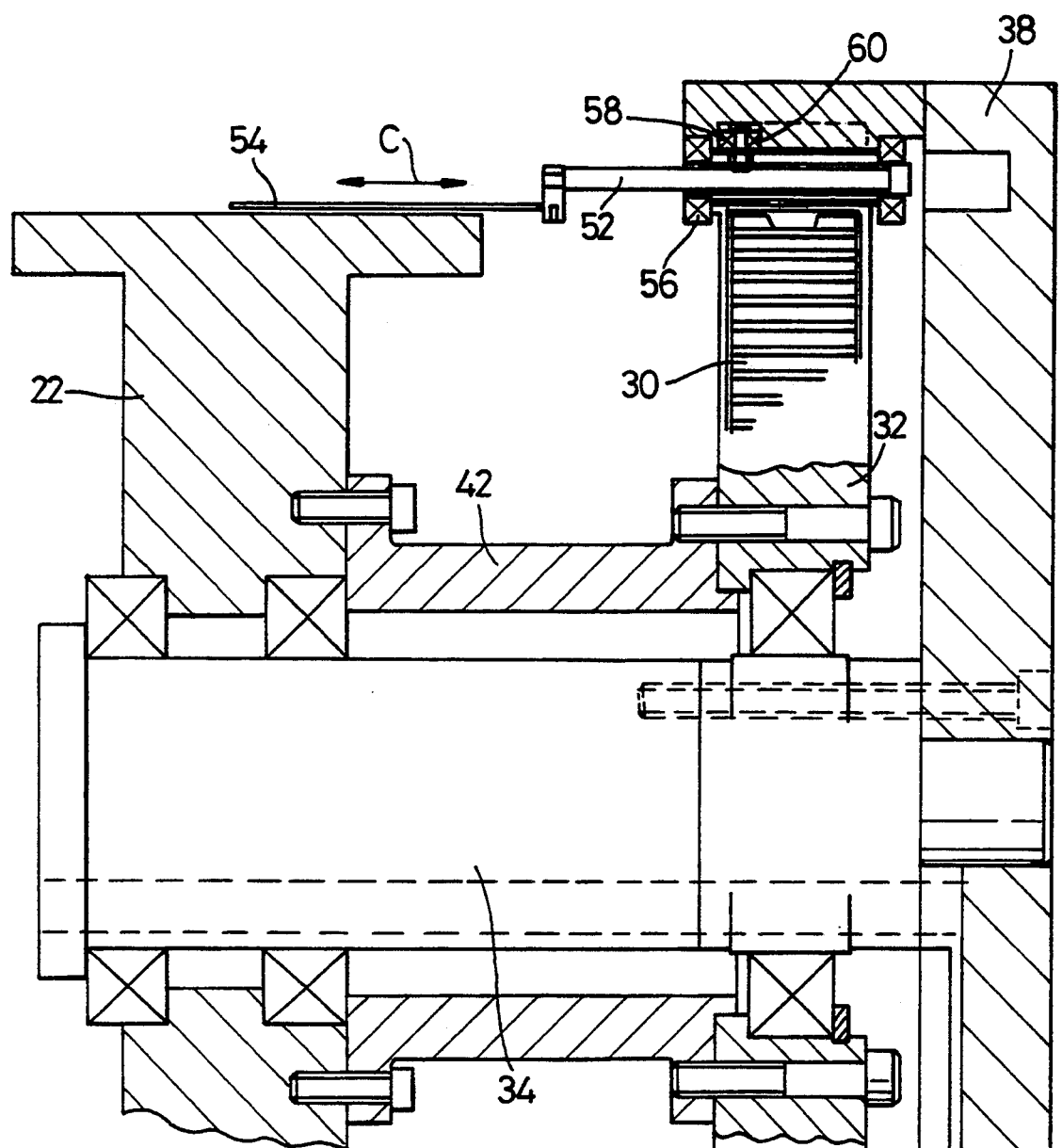
FIG. 2 is a transverse sectional view of the loop displacement pins associated with the second assembly wheel, and of their controlling mechanism.
Figure 3:
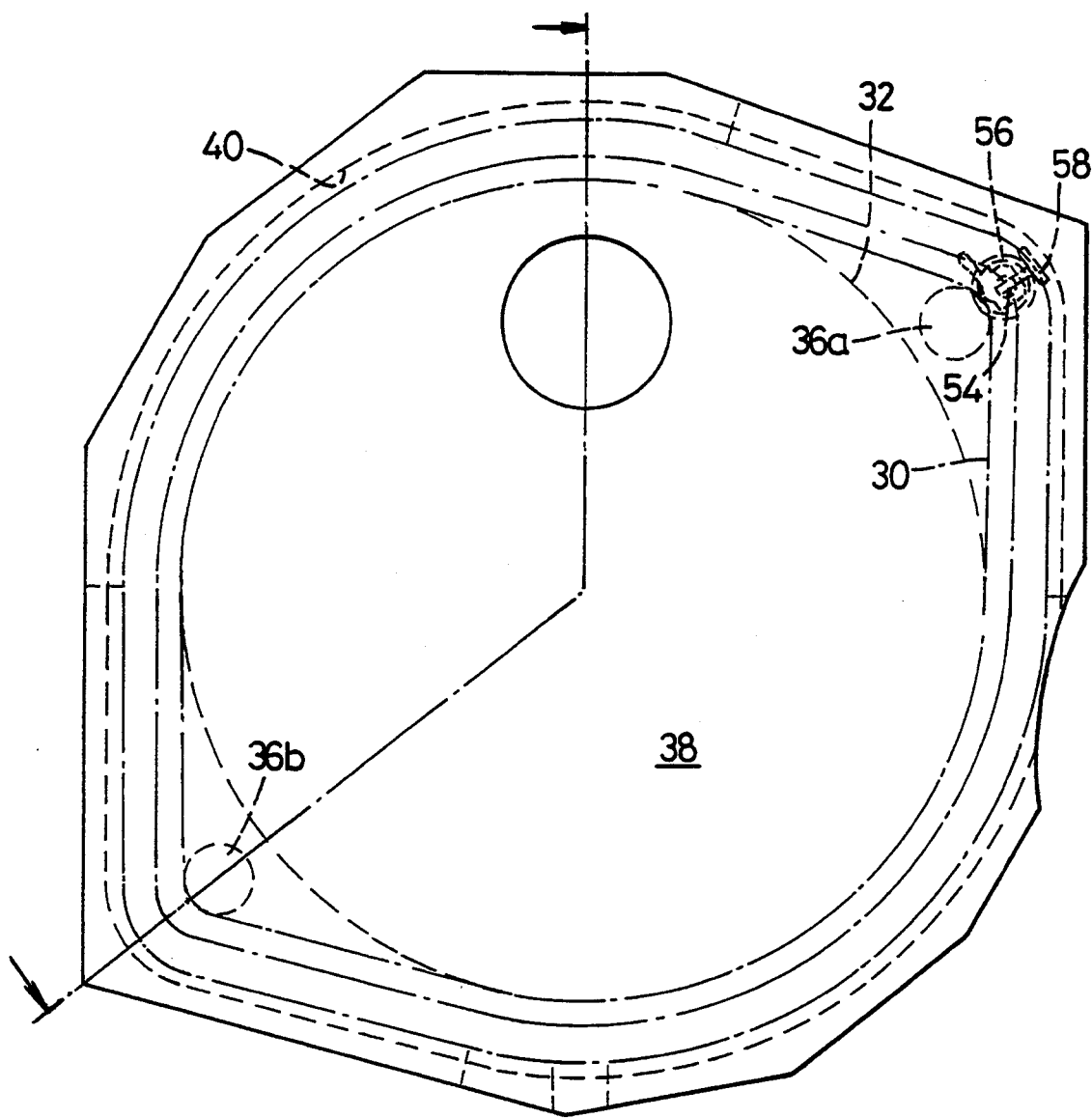
FIG. 3 is a front view of the cam track for controlling the displacement pin movements.
Figure 4:
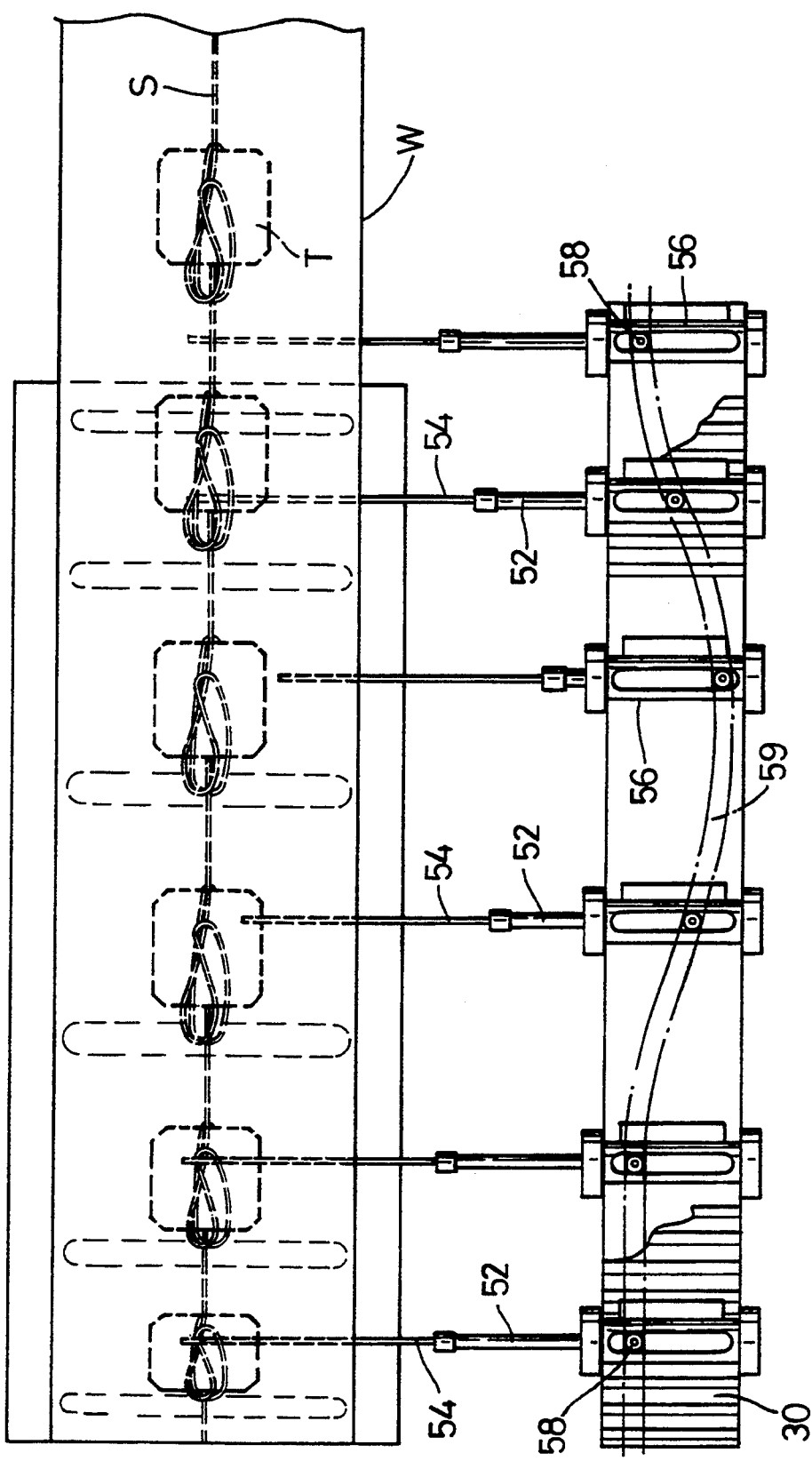
FIG. 4 is a top plan view of the second assembly wheel and the displacement pins with their guides and drive belt.
Figure 5:
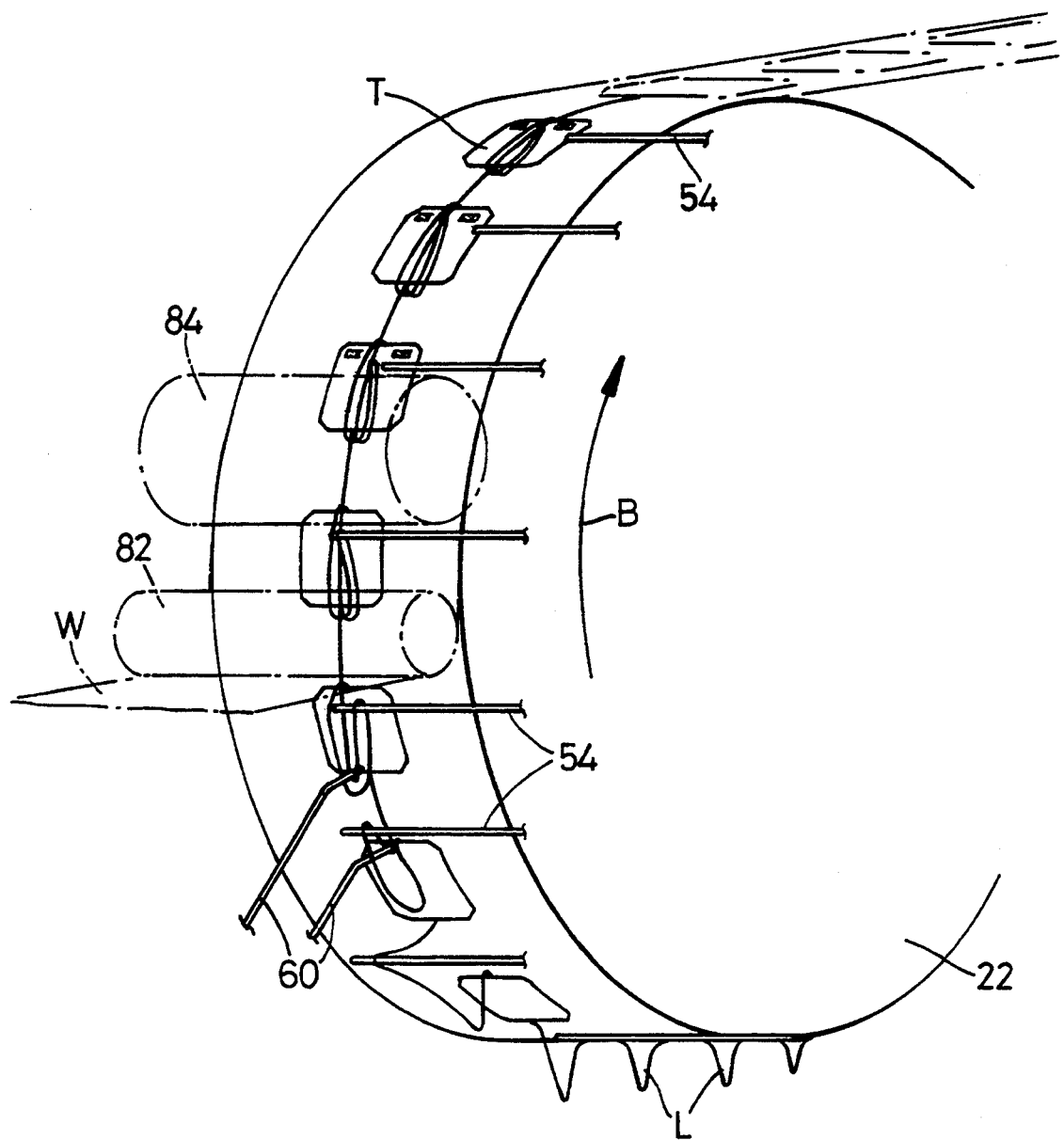
FIG. 5 is a schematic illustration of the second assembly wheel showing one of its associated loop gatherers.

Mounted at regular intervals on the belt 30 through sliders 52 are a series of displacement pins 54 which project from the belt generally parallel to the axis of rotation of the second wheel. The sliders are supported in guides 56 fixed to the belt and have radially projecting cam followers 58. A stationary secondary cam track 59 extending around the support plate 38 is engaged by the cam followers 58 so that the sliders 52 and their pins 54 reciprocate in the axial direction C (FIG. 2) in which the pins project. At predetermined regions of the circulating path of the belt 30 the pins are thereby displaced between extended positions in which they overlap the thread S on the second wheel, and retracted positions clear of both the thread and the tags, as is best seen in FIG. 4.

As they move in the direction B and approach the region of convergence of the two assembly wheels 2,22, the sliders 52 leave the first angled portion of the cam track, around the idler wheel 36a. At the point where the tags and thread are transferred from one wheel to the other, the pins 54 have been extended to overlap the plane of the thread on the first wheel. This extension takes place during travel along the first angled track portion and at the same time the pins are brought into register circumferentially with the spaces between the tag seats on the second wheel. Over the following lower region of the second wheel, immediately after the transfer of the thread and tags to that wheel, the thread loops L are subjected to suction by vacuum means (indicated only by the arrow D) to draw them downwards, in particular to prevent them twisting.

As the circulation of the belt 30 and the second wheel 22 continues, the pins 54 come to the region of the second angled portion of the cam track around the other idler wheel 36b and the paths of the wheel 22 and belt 30 diverge. The pins 54 are displaced with the belt 30 away from the wheel periphery while engaging the loops L as they extend transversely away from the tags. Further along this region the pins follow the rising path of the belt and begin to converge towards the wheel. In the latter part of this angular course, opposite ends of the loops L are therefore supported by the tags, which are held by suction against the wheel 22, and by the pins 54 and hang loosely between these supports.

It will be noted that the angled path is longer than the corresponding sector of the assembly wheel 22. Each pin therefore begins to lag behind its associated thread loop and where it returns to the periphery of the assembly wheel it comes against the back of the tag that was earlier following it on the assembly wheel. The free end of the loop has thus been displaced onto the end of the tag. The two lengths of the thread that extend between the wheel 22 and a pin 54 and that form together from the loop cannot be precisely controlled in these movements, however so as to be kept equal. Gathering means are therefore provided to act while the free end of the loop is being positioned, to ensure that the two sagging lengths are at least approximately equal, in order to accumulate the thread into a doubled or folded loop with a smaller overall length.

Figure 6:
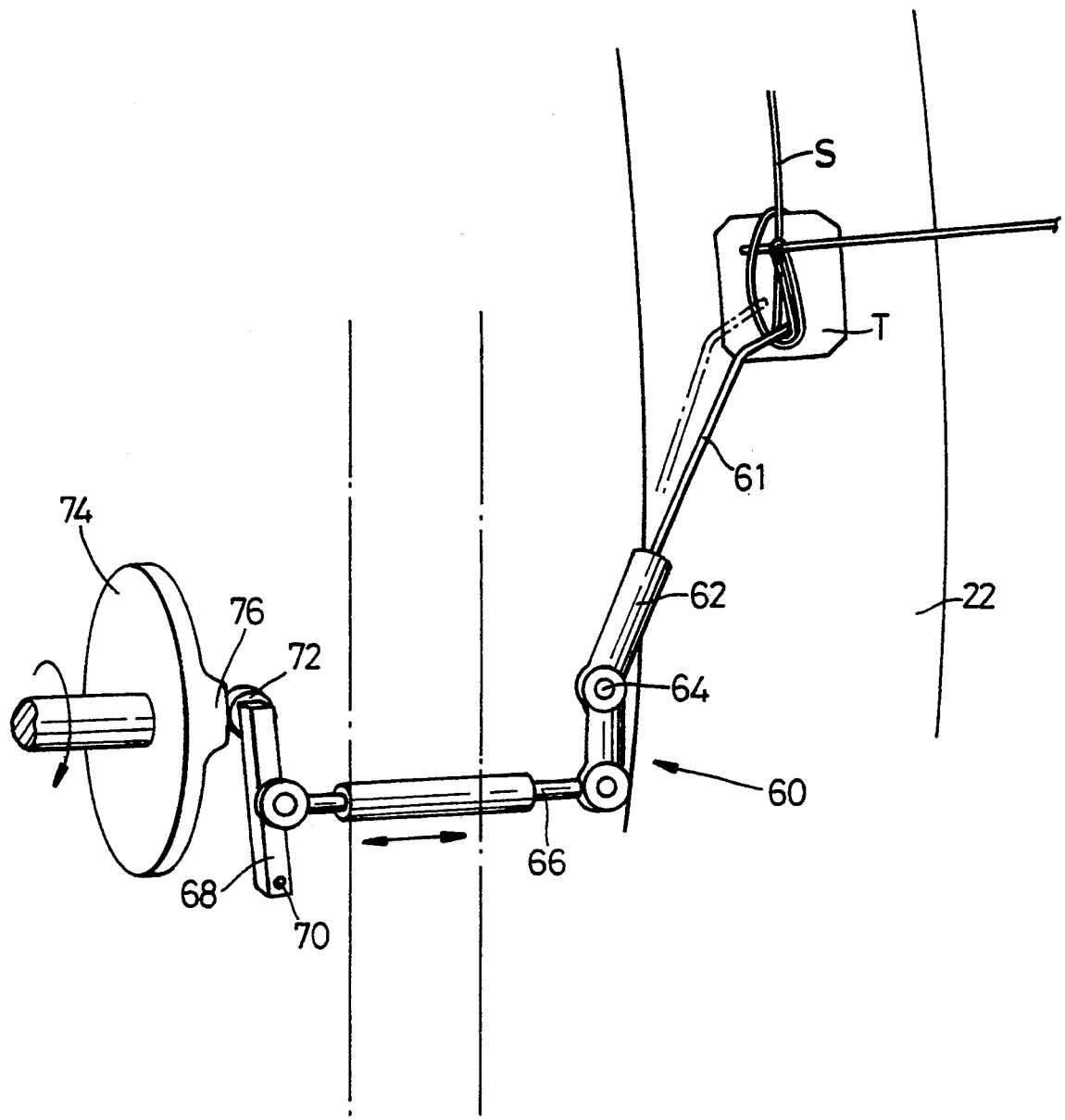
FIG. 6 illustrates one of the loop gatherers in more detail.
Figure 7:
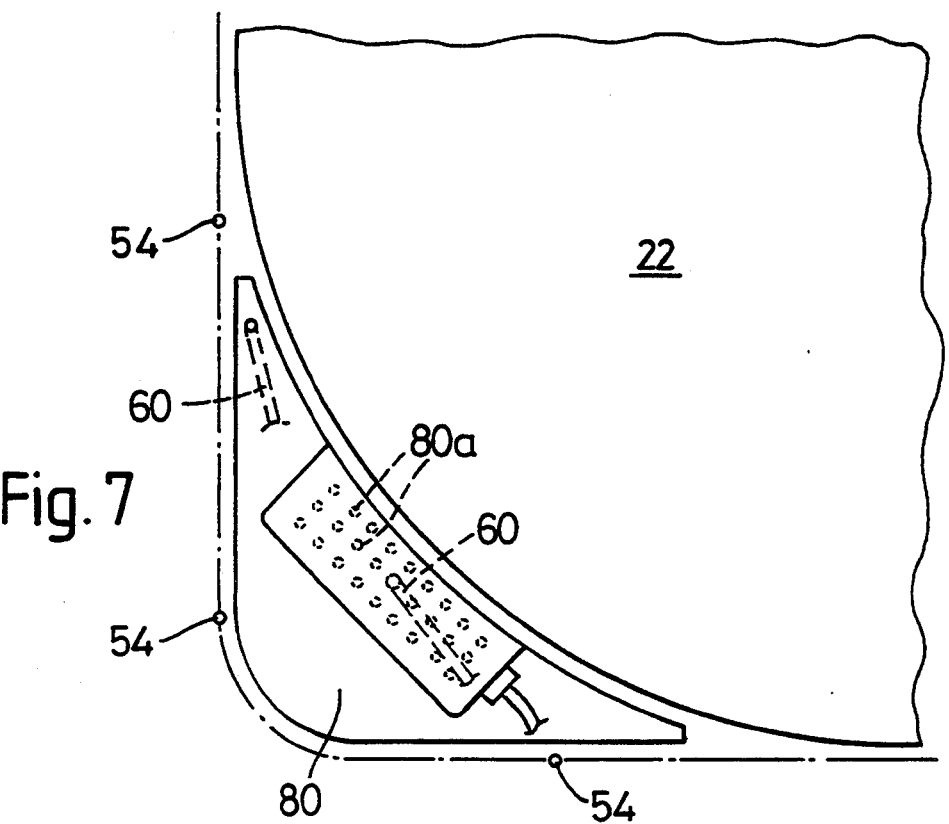
FIGS. 7 and 8 are side and end views showing the loop gatherers and loop suction means associated with the thread doubling mechanism of the second assembly wheel.
Figure 8:
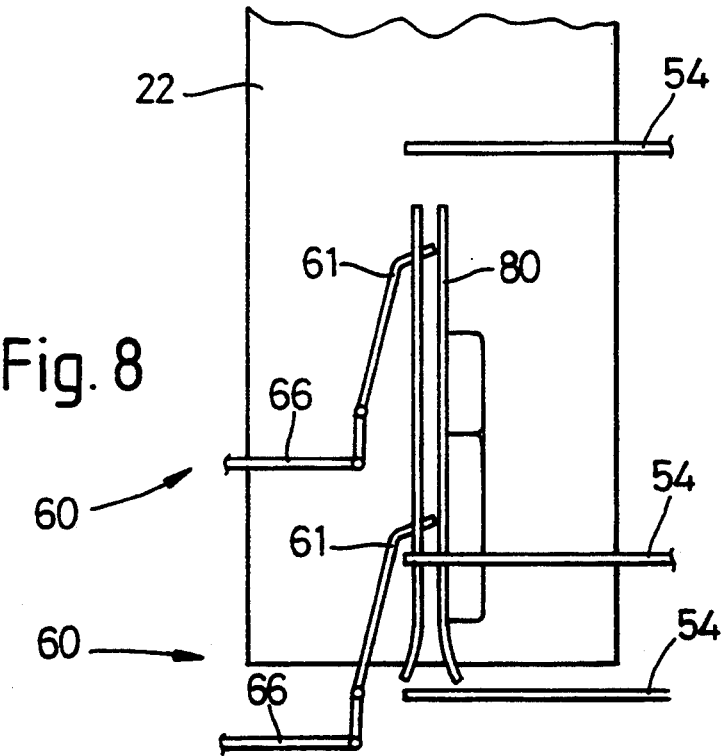

The gathering means is provided by two similar mechanisms 60, spaced in series along this region of the periphery of the wheel 22. One of the mechanisms 60 is shown in more detail in FIG. 6. It comprises a finger 61 extending from a lever 62 having a fixed centre pivot 64. The other end of the lever is attached by a link 66 to a cam lever 68 with a fixed pivot 70 at one end and a roller 72 at the other bearing on a rotary cam disc 74 having a rise 76 in the path of the roller. As the roller 72 contacts the rise 76, the cam lever 68 pivots and transmits its motion through the link 66 and lever 62 to the finger 60 which thereby moves with an upward motion from the position shown in solid lines in which it is gathering the loop to the broken-line position in which it is withdrawn clear of the loop and out of the path of the thread. At the same time the loop is rising with the movement of the wheel 22 and its associated pin 54.

If one of the two sagging lengths of the loop is significantly shorter than the other as the finger 61 moves to the gathering position it will engage that length and arrest it momentarily, so drawing thread from the longer length to the shorter length. The length occupied by the loop with respect to the wheel periphery can thus be reduced to locate the greater part of the loop over its associated tag. The two gathering mechanisms 60 act in sequence to each other so that the lower mechanism can gather the main part of the thread, separating it from the preceding loop. The upper mechanism then finally forms the doubled loop and its finger is withdrawn just as the loop is drawn taut, so that the two lengths are then substantially equalised.

Between the positions at which the gathering fingers 60 act on it, the thread loop passes through a guide 80 intended to constrain the loop centrally on the assembly wheel to prevent any danger of it slipping from the pin, which at this stage is held in its fully extended position. The loop guide is provided with a series of suction apertures 80a which help to maintain the general shape of the loop formed by the lower gathering finger and to dampen any erratic motion of the loop.

A web W of sheet material from which the infusion packets are to be formed passes under a guide roller 82 to be laid onto the second assembly wheel 22 at a position immediately following the gathering mechanisms 60 in the direction of rotation B. The web is arranged to meet the wheel at such a point that it traps the gathered loop L' between web and tag before the loop is released by the finger 60 of the upper gathering mechanism. Traction rollers (not shown) lie further downstream to draw the web along the path shown.

Immediately beyond the point at which it has been placed against the thread and tags on the second assembly wheel, a heat sealing roller 84 bears on the web to tack seal the tags to it at a pair of heat seal areas on each side of the thread. The loops L' are thereby retained securely in their doubled form between the web and the tags. At a subsequent step the thread is permanently secured to the tags and the web, whether by heat seals or by the application of adhesive, in order to make secure an elongate flexible connection between each infusion packet and its tag, but these later assembly steps do not disturb the retention of the doubled loops between web and tags.

The pins 54 can be retracted from the doubled loops as soon as the web W bears against them to stabilise the loop configurations on the second assembly wheel and the heat sealing roller has operated to capture the assembly. The pins remain retracted as they reach the highest point of their circulatory path. They then follow the angled course around the idler wheel 36a where their extended path relative to the wheel periphery serves to return the pins into registration with further loops transferring from the first assembly wheel. As they approach the transfer region the sliders are extended to place the pins in the path of those loops.

It will be understood that following the assembly of the web, thread and tags as shown in FIG. 4, further processing may take place generally in the manner described in EP 448325A to produce the completed infusion packets.

Although in the example described the loops are doubled over with a single fold, it will be understood that the present invention also extends to arrangements in which there is further folding or doubling of the thread if it is required to hold a greater length of thread under a tag.

Figure 9:
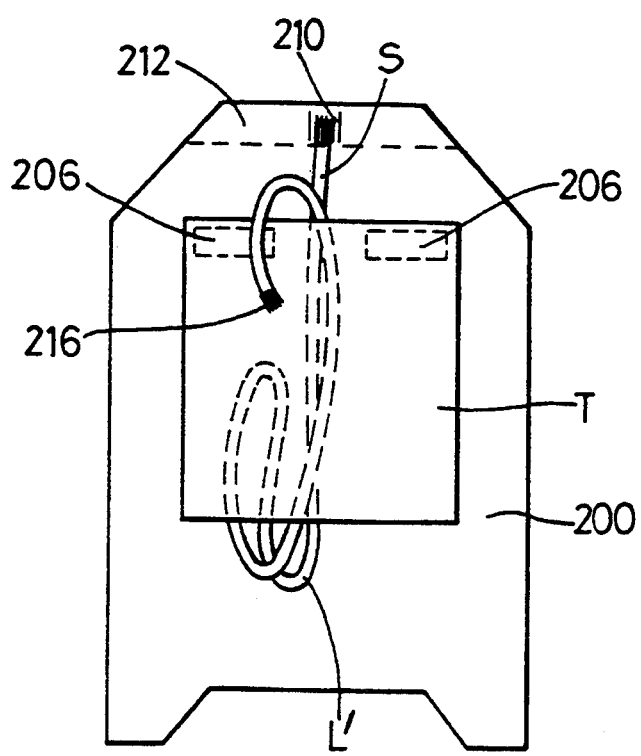
FIG. 9 shows one form of tea bag resulting from the tag and thread assemblies produced on the apparatus of the preceding figures.

FIG. 9 illustrates the incorporation of the assemblies of tag and thread with a web of heat sealable material as described above in a completed tea bag. The main body 200 of the tea bag has a double-compartmented form described in more detail in EP 448325A, to which reference can be made for a description of the further handling of the tag-thread-web assemblies. The tea bag can, however, take any desired form. The tag T is detachably secured to the body by the light heat-sealing welds 206 made by the roller 84. The thread T is permanently welded at one end 210 to the main body 200, conveniently by welding to the body end seal 212 at the same time as that heat seal is formed, although it may alternatively be secured by adhesive such as hot melt adhesive.

The main part of the thread intermediate its ends lies as the folded loop L' hidden under the tag T but with a portion projecting from the bottom of the tag. The opposite end 216 of the thread is located over the outer surface of the tag and attached to it. Attachment of the end of the thread to the tag may be accomplished using hot melt adhesive, or it may be accomplished by heat sealing the end of the thread to the tag.

The surface of the tag facing the thread may be treated to be more receptive to bonding with the thermoplastic material of the thread. As examples, the surface of the tag facing the thread may have a coating of a thermoplastic material such as polypropylene or it may be roughened or made porous to facilitate the penetration of the heat-sealable thread material into the surface when the thread has been softened by heat.

Although the thread is held mainly underneath the tag before use, it may be preferred to weld it detachably to the body to ensure it does not become displaced inadvertently with the risk of snagging on extraneous objects. This can conveniently be done on the exposed portion of the thread loop below the tag.

The thread may contain polypropylene in admixture with a further material which is not subject to melting at the melting point of the polypropylene, e.g. a polyester having a melting point some 20° C. or more higher than the melting point of the polypropylene. The strength of the thread in the region of the heat seal can be improved this way. To ensure satisfactory heat sealing it is desirable that the thread is not coated with lubricants, as is commonly done in the production of thermoplastic filaments.

We claim:

1. Apparatus for producing an assembly of tags and thread with a web in which the tags are located at spaced intervals along the length of the web with a length of attaching thread between each successive pair of tags having a length greater than the spacing between the tags, the apparatus comprising means for forming the thread between the tags into loops, means engageable with the thread loops so formed for doubling over said loops, and for locating the doubled loops at least partially against the tags and means for bringing the web and tags together with said loops between them to hold the loops releasably in said doubled form.

2. Apparatus according to claim 1 comprising loop-forming means on which the thread is drawn out between the tags to produce a series of loops between successive tags, displacement means for engagement in said loops, and means for moving said displacement means relative to the tags to overlap a portion of each loop with its associated tag for said doubling over of the loops.

3. Apparatus according to claim 2 comprising means for progressing the tags and said displacement means along a common path with the loops extending transversely from said path, means for inserting the displacement means in the loops during the progress of the tags along said common path, and said progressing means further comprising means for moving the tags and the displacement means on divergent paths to hold free ends of the loops remote from the tags suspended from the displacement means, and thereafter to move them on convergent paths to bring said free ends of the loops adjacent to the tags.

4. Apparatus according to claim 3 wherein said progressing means comprise respective circulatory devices for the tags and for the displacement means, said devices causing the displacement means to lag during said divergent and convergent movements to bring the free ends of the loops adjacent the tags.

5. Apparatus according to claim 3 wherein the loops are arranged to depend transversely from the tags under gravity.

6. Apparatus according to claim 2 wherein suction means act on the loops to urge them to extend transversely from the tags.

7. Apparatus according to claim 2 comprising gathering means for contacting the thread loops engaged by the displacement means intermediate the tags and the displacement means, said gathering means being movable relative to said displacement means to at least approximately equalise the lengths of thread in each loop extending between the displacement means and the tags.

8. Apparatus according to claim 7 wherein the gathering means comprises at least one retention element insertable into the path of each loop during said convergence of the paths of the tags and the retaining means in order to retain either length of the loop coming into contact with it until said lengths are at least approximately equal.

9. Apparatus according to claim 7 comprising means for applying the web against the thread and tags after the loops have been doubled over and placed adjacent their respective tags.

10. A method of assembling a series of tags at spaced intervals along the length of a web with an attaching thread for securing each tag to the web, in which the thread is formed into loops between the tags whereby the thread between the tags has a length greater than the tag spacing, and said loops are doubled over and are located at least partially between the tags and the web to hold them releasably in said doubled form.

11. A method according to claim 10 wherein the thread loops are arranged to hang down from the tags and are doubled over by lifting dependent free ends of the loops towards the tags.

12. A method according to claim 10 wherein each thread loop comprises two lengths of thread between the tags and a free end of the loop spaced from the tags and said thread lengths are made substantially equal while being doubled over.

13. A method according to claim 10 wherein the loops are restrained by a suction force drawing them away from the tags during the doubling of the loops.

14. A method according to claim 10 wherein after the doubled loops have been located adjacent the tags the web is applied over the tags to trap the loops between the web and the tags, the tags then being attached to the web.

* * * * *